(12) United States Patent
Lemmers, Jr.

(10) Patent No.: US 8,876,650 B2
(45) Date of Patent: Nov. 4, 2014

(54) AIRCRAFT ACCESSORY DRIVE MULTIPLE SPEED TRANSMISSION

(75) Inventor: Glenn C. Lemmers, Jr., Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 232 days.

(21) Appl. No.: 13/436,331

(22) Filed: Mar. 30, 2012

(65) Prior Publication Data

US 2013/0260950 A1 Oct. 3, 2013

(51) Int. Cl.
  *F16H 3/72* (2006.01)
  *F16H 37/06* (2006.01)
  *F16H 3/74* (2006.01)
  *F16H 3/44* (2006.01)

(52) U.S. Cl.
  USPC .............................. 475/259; 475/5; 475/269

(58) Field of Classification Search
  USPC ................. 475/4, 5, 9, 10; 60/39.13, 788
  See application file for complete search history.

(56) References Cited

U.S. PATENT DOCUMENTS

| | | | |
|---|---|---|---|
| 4,401,938 A | 8/1983 | Cronin | |
| 5,627,744 A | 5/1997 | Baker et al. | |
| 5,939,800 A | 8/1999 | Artinian et al. | |
| 6,124,646 A | 9/2000 | Artinian et al. | |
| 6,707,205 B2 | 3/2004 | Johnsen | |
| 6,838,779 B1 | 1/2005 | Kandil et al. | |
| 7,481,062 B2 * | 1/2009 | Gaines et al. | 60/792 |
| 7,946,403 B2 | 5/2011 | Burke et al. | |
| 8,018,086 B2 | 9/2011 | Legros | |
| 8,039,983 B2 | 10/2011 | Cote et al. | |
| 8,089,179 B2 | 1/2012 | Legros | |
| 8,132,480 B2 | 3/2012 | Allen et al. | |
| 8,134,344 B2 | 3/2012 | Hodge | |
| 8,500,583 B2 * | 8/2013 | Goi et al. | 475/5 |
| 8,561,503 B2 * | 10/2013 | Lemmers et al. | 74/733.1 |
| 2004/0090204 A1 | 5/2004 | McGinley | |
| 2009/0255278 A1 | 10/2009 | Taras et al. | |
| 2010/0200692 A1 * | 8/2010 | Goi et al. | 244/58 |
| 2010/0208393 A1 | 8/2010 | Vedula et al. | |
| 2011/0138827 A1 | 6/2011 | Lifson et al. | |
| 2012/0015776 A1 * | 1/2012 | Lemmers, Jr. | 475/271 |
| 2012/0115662 A1 * | 5/2012 | Han | 475/31 |
| 2013/0000314 A1 * | 1/2013 | McCaffrey | 60/773 |
| 2013/0000323 A1 * | 1/2013 | Kupratis | 60/801 |
| 2013/0232941 A1 * | 9/2013 | Huang | 60/39.24 |
| 2013/0247539 A1 * | 9/2013 | Hoppe | 60/39.15 |

FOREIGN PATENT DOCUMENTS

EP 2402560 A1 1/2012

* cited by examiner

*Primary Examiner* — Tisha Lewis
(74) *Attorney, Agent, or Firm* — Cantor Colburn LLP

(57) ABSTRACT

A transmission assembly is provided and includes a load, an input shaft rotatably driven by a low pressure section of a turbomachine and a transmission coupled to the load and the input shaft. The transmission is operable to transmit rotation of the input shaft to the load and configured to convert a first rotational speed range of the input shaft to a second rotational speed range for transmission to the load. The second rotational speed range is narrower than the first rotational speed range.

14 Claims, 3 Drawing Sheets

AIRCRAFT ACCESSORY DRIVE MULTIPLE SPEED TRANSMISSION

BACKGROUND OF THE INVENTION

The subject matter disclosed herein relates to a transmission assembly and, more particularly, to a multiple speed transmission for use with an aircraft accessory drive.

To improve aircraft turbine engine efficiency and fuel burn, manufacturers have attempted to increase turbine engine bypass ratios. Engines having increased turbine engine bypass ratios, however, often have high, intermediate and low pressure turbine sections with limited power extraction capability from the high pressure section. As such, manufacturers are interested in extracting power from the low pressure section.

A problem with power extraction from a turbine engine low pressure section is that the speed range over which the low pressure section operates has a speed ratio of about 5:1 vs. a 2:1 ratio for a typical turbine engine high pressure section. Until now, it has been difficult to use this extended speed range as an input to a variable frequency generator, which produces constant frequency or narrow band variable frequency (360-800 Hz) electric power.

BRIEF DESCRIPTION OF THE INVENTION

According to an aspect of the invention, a transmission assembly is provided and includes a load, an input shaft rotatably driven by a low pressure section of a turbomachine and a transmission coupled to the load and the input shaft. The transmission is operable to transmit rotation of the input shaft to the load and configured to convert a first rotational speed range of the input shaft to a second rotational speed range for transmission to the load. The second rotational speed range is narrower than the first rotational speed range.

According to another aspect of the invention, a transmission assembly is provided and includes a variable frequency generator (VFG), an input shaft rotatably driven by a low pressure section of a turbomachine and a transmission coupled to the VFG and the input shaft, the transmission being operable to transmit rotation of the input shaft to the VFG. The transmission is configured to convert a first rotational speed range of the input shaft to a second rotational speed range for transmission to the VFG. The second rotational speed range is narrower than the first rotational speed range.

According to yet another aspect of the invention, a transmission assembly for an aircraft engine is provided and includes a variable frequency generator (VFG), an input shaft rotatably driven by a low pressure section of a turbomachine and a transmission coupled to the VFG and the input shaft. The transmission is operable to transmit rotation of the input shaft to the VFG and includes a bi-coupled planetary gear arrangement that generates three respectively overlapping gear ratios. The planetary gear arrangement is configured to convert a first rotational speed range of the input shaft to a second rotational speed range for transmission to the VFG. The second rotational speed range is narrower than the first rotational speed range.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying figures in which:

The detailed description explains embodiments of the invention, together with advantages and features, by way of example with reference to the figures.

DETAILED DESCRIPTION OF THE INVENTION

Figure 1:
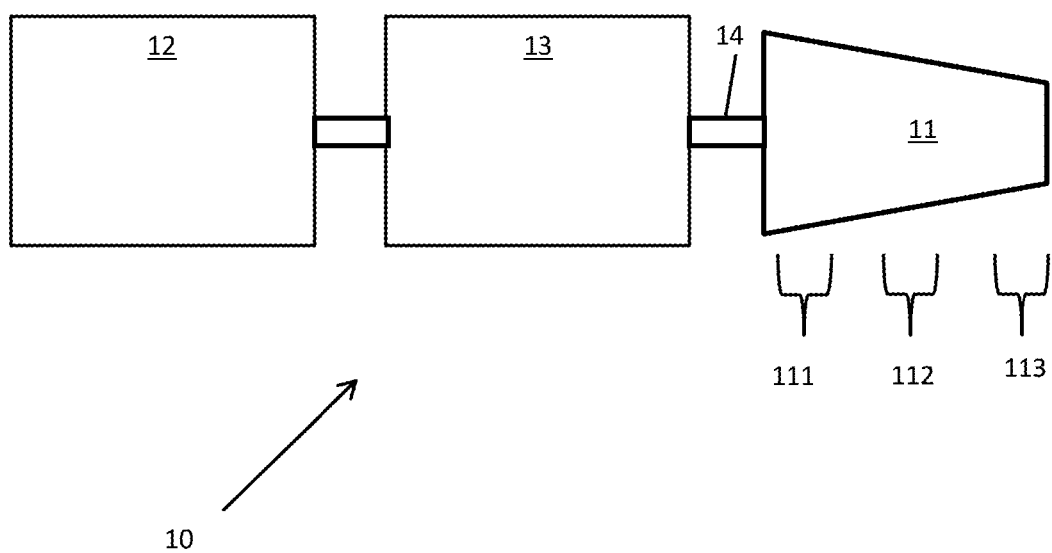
FIG. 1 is a schematic view of a transmission assembly in accordance with embodiments.

With reference to FIG. 1, a transmission assembly 10 is provided. The transmission assembly includes a turbomachine 11, such as an aircraft engine, a load 12, such as a 4-pole variable frequency generator (VFG) or an aircraft accessory load, and a transmission 13. The turbomachine 11 has a high pressure section 111, an intermediate pressure section 112 and a low pressure section 113. At least the low pressure section 113 is configured to drive rotation of an input shaft 14 that is operably coupled to the transmission 13 with a speed range of about 2,000-10,000 rpm (i.e., a 5:1 input speed range). The load 12 is operably coupled to the transmission 13 and configured to generate electrical power for, for example, electrical systems on an aircraft at about 360-800 Hz at an input speed range of about 10,800-24,000 rpm.

The transmission 13 is thus operably disposed between the input shaft 14 and the load 12 such that the transmission 13 is configured and disposed to transmit rotation of the input shaft 14 to the load 12. In accordance with embodiments, the transmission 13 is further configured to convert a first rotational speed range of the input shaft 14 to a second rotational speed range, which is narrower than the first rotational speed range, for rotation transmission to the load 12. As an example, as noted above, the first rotational speed range has about a 5:1 speed range and the second rotational speed range has about a 2.22:1 speed range.

Figure 2:
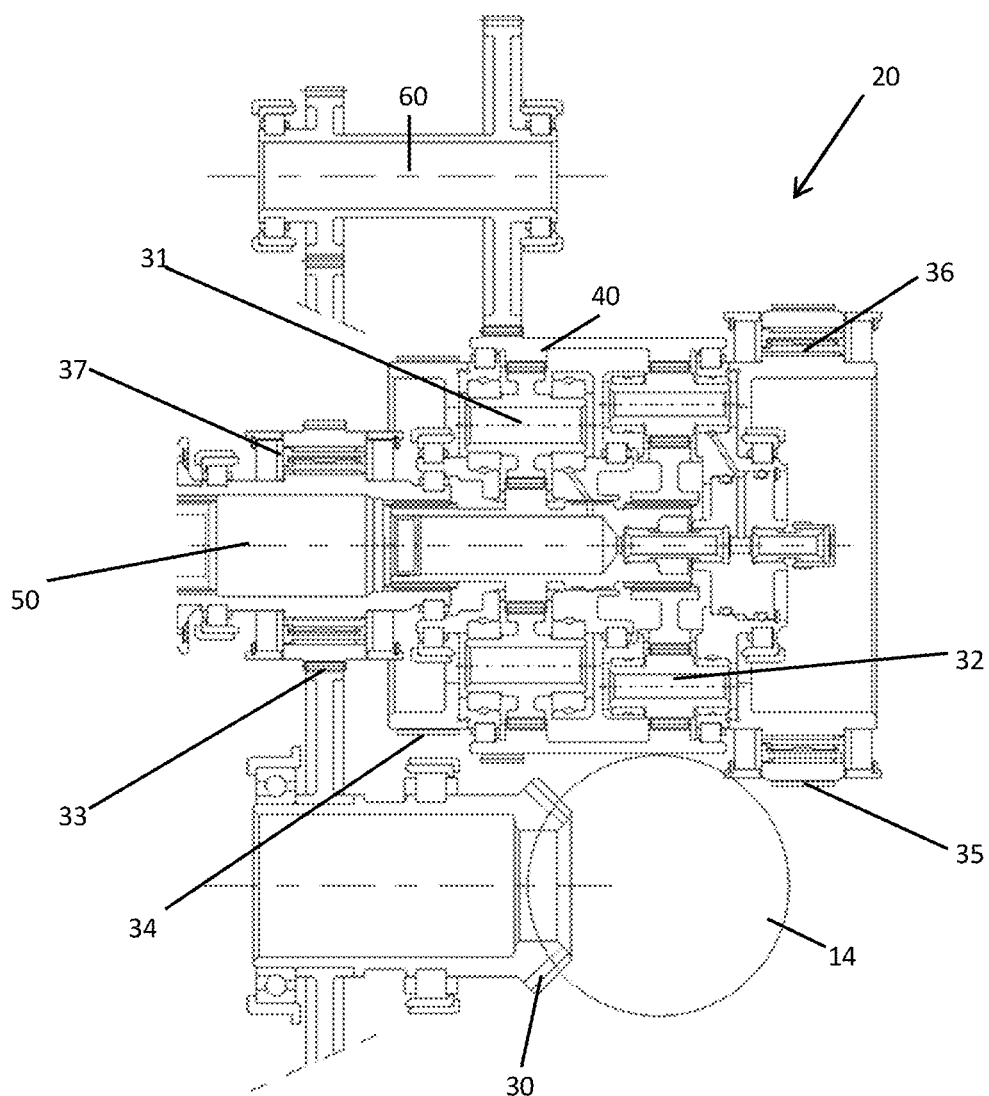
FIG. 2 is a side view of an exemplary transmission for use in the transmission assembly of FIG. 1.
Figure 3:
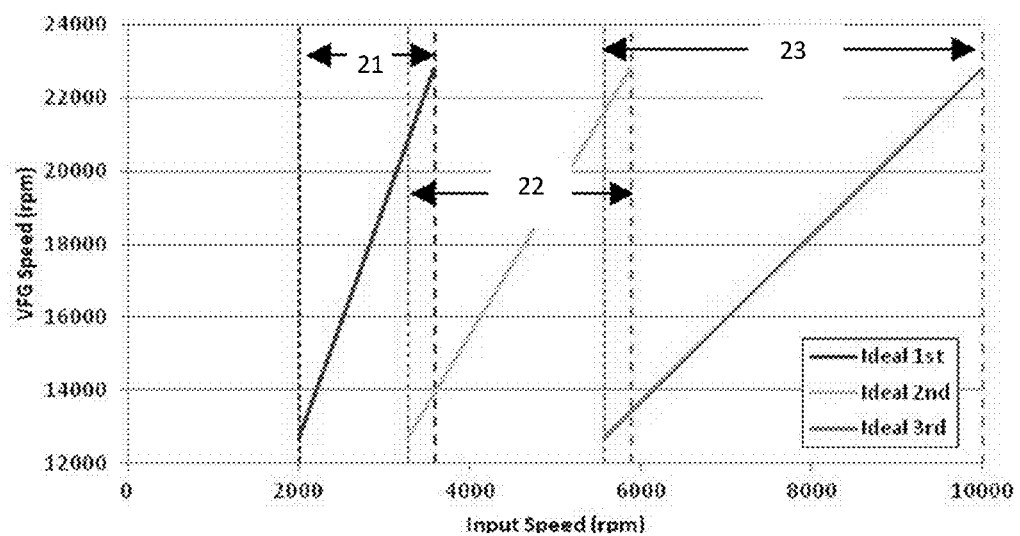
FIG. 3 is a graphical depiction of gear ratios generated by the transmission of FIG. 2.

With reference to FIGS. 2 and 3, the transmission 13 may achieve this input speed range reduction via a bi-coupled planetary gear arrangement 20 or a similar type of gear arrangement. As shown in FIG. 3, the bi-coupled planetary gear arrangement 20 generates a first gear ratio 21, a second gear ratio 22 and a third gear ratio 23. The first gear ratio 21 is operative over about 2,000-4,000 rpm, the second gear ratio 22 is operative over about >4,000-6,000 rpm and the third gear ratio 23 is operative over about >6,000-10,000 rpm. The overlaps between the first and second gear ratios 21, 22 and the overlap between the second and third gear ratios 22, 23 serve to avoid doorbelling during shifting.

Still referring to FIG. 2, an embodiment of the bi-coupled planetary gear arrangement 20 is provided. As shown in FIG. 2, the bi-coupled planetary gear arrangement 20 is coupled to the input shaft 14 via a bevel gear set 30 and a ring gear 40. The bi-coupled planetary gear arrangement 20 is further coupled to output shaft 50, which drives the load 12. The bevel gear set 30 drives an idler shaft 60 that corrects the ring gear 40 rotational direction. The bi-coupled planetary gear arrangement 20 further includes first planetary gear set 31, second planetary gear set 32 and third gear set 33 as well as first brake 34, second brake 35, first overrunning clutch 36 and second overrunning clutch 37. The first and second brakes 34 and 35 may be provided as band, cone or disk brakes.

In operation, the first gear ratio 21 is defined with the first brake 34 and the second brake 35 engaged. The second gear ratio 22 is defined with the first brake 34 released, the second brake 35 engaged, and a relative speed of an overrunning clutch member of the first overrunning clutch 36 set to zero. The third gear ratio 23 is defined with both the first and second brakes 34 and 35 released and a relative speed of an overrunning clutch member of the second overrunning clutch 37 set to zero.

With the transmission assembly 10 provided as described above, a rotational input speed to the load 12 will be maintained within a range of about 10,800-24,000 rpm despite the rotational speed of the input shaft 14 being maintained within a range of about 2,000-10,000 rpm as driven by the low pressure section 113 of the turbomachine 11. As such, the load 12 will be able to generate power at about 360-800 Hz.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A transmission assembly, comprising:
a load;
an input shaft rotatably driven by a low pressure section of a turbomachine; and
a transmission coupled to the load and the input shaft, the transmission being operable to transmit rotation of the input shaft to the load and comprising:
a bi-coupled planetary gear arrangement generating a first gear ratio operative between about 2000-4000 rpm, a second gear ratio overlapping the first gear ratio and operative to about 6000 rpm and a third gear ratio overlapping the second gear ratio and operative to about 10,000 rpm,
the transmission being configured to convert a first rotational speed range of the input shaft to a second rotational speed range for transmission to the load, the second rotational speed range being narrower than the first rotational speed range.

2. The transmission assembly according to claim 1, wherein the load comprises a variable frequency generator (VFG).

3. The transmission assembly according to claim 1, wherein the load comprises an aircraft engine accessory load.

4. The transmission assembly according to claim 1, wherein the input shaft is rotatably driven by a low pressure section of an aircraft engine turbine.

5. The transmission assembly according to claim 1, wherein the first rotational speed range has about a 5:1 speed range and the second rotational speed range has about a 2.22:1 speed range.

6. The transmission assembly according to claim 1, wherein the first, second and third gear ratios generated by the bi-coupled planetary gear arrangement are each configured to reduce the first rotational speed range to the second rotational speed range.

7. A transmission assembly, comprising:
a variable frequency generator (VFG);
an input shaft rotatably driven by a low pressure section of a turbomachine; and
a transmission coupled to the VFG and the input shaft, the transmission being operable to transmit rotation of the input shaft to the VFG and comprising a bi-coupled planetary gear arrangement including:
first and second brakes, which are each engaged to define a first gear ratio of the bi-coupled planetary gear arrangement; and
overrunning clutch members of first and second overrunning clutches, a second gear ratio of the bi-coupled planetary gear arrangement being defined with the first brake released and a relative speed of the overrunning clutch member of the first overrunning clutch set to zero and a third year ratio of the bi-coupled planetary gear arrangement being defined with the first and second brakes released and a relative speed of the overrunning clutch member of the second overrunning clutch set to zero,
the transmission being configured to convert a first rotational speed range of the input shaft to a second rotational speed range for transmission to the VFG, the second rotational speed range being narrower than the first rotational speed range.

8. The transmission assembly according to claim 7, wherein the input shaft is rotatably driven by a low pressure section of an aircraft engine turbine.

9. The transmission assembly according to claim 7, wherein the first rotational speed range has about a 5:1 speed range and the second rotational speed range has about a 2.22:1 speed range.

10. The transmission assembly according to claim 7, wherein the bi-coupled planetary gear arrangement generates the first, second and third gear ratios, which are each configured to reduce the first rotational speed range to the second rotational speed range.

11. The transmission assembly according to claim 10, wherein the first and second gear ratios overlap and the second and third gear ratios overlap.

12. A transmission assembly for an aircraft engine, comprising:
a variable frequency generator (VFG);
an input shaft rotatably driven by a low pressure section of a turbomachine; and
a transmission coupled to the VFG and the input shaft, the transmission being operable to transmit rotation of the input shaft to the VFG,
the transmission including a bi-coupled planetary gear arrangement that generates first, second and third respectively overlapping gear ratios, the planetary gear arrangement comprising:
first and second brakes, which are each engaged to define the first gear; and
overrunning clutch members of first and second overrunning clutches,
the second gear ratio being defined with the first brake released and a relative speed of the overrunning clutch member of the first overrunning clutch set to zero, and
the third gear ratio being defined with the first and second brakes released and a relative speed of the overrunning clutch member of the second overrunning clutch set to zero,
the planetary gear arrangement being configured to convert a first rotational speed range of the input shaft to a second rotational speed range for transmission to the VFG, the second rotational speed range being narrower than the first rotational speed range.

13. The transmission assembly according to claim 12, wherein the planetary gear arrangement comprises:
- a first planetary gear set disposed axially between a second planetary gear set and a third gear set,
- the first brake being disposed axially between the first planetary gear set and the third gear set,
- the second brake being disposed axially forward of the second planetary gear set,
- the first overrunning clutch being disposed coaxially with the second brake, and
- the second overrunning clutch being disposed coaxially with the third gear set.

14. The transmission assembly according to claim 12, wherein the first gear ratio is operative between about 2000-4000 rpm, the second gear ratio overlaps the first gear ratio and is operative to about 6000 rpm and the third gear ratio overlaps the second gear ratio and is operative to about 10,000 rpm.

* * * * *